United States Patent
Pinon et al.

(10) Patent No.: US 8,426,770 B2
(45) Date of Patent: Apr. 23, 2013

(54) METHOD AND DEVICE FOR QUALITY CONTROL OF A WELD BEAD

(75) Inventors: Henri Pinon, Courbevoie (FR); Sebastien Vallet, Velizy (FR); Igor Smurov, Saint Etienne Cedex (FR); Philippe Bertrand, Saint Etienne Cedex (FR); Mikhail Ignatieu, Saint Etienne Cedex (FR)

(73) Assignee: Renault S.A.S., Boulogne Billancourt (FR)

( * ) Notice: Subject to any disclaimer, the term of this patent is extended or adjusted under 35 U.S.C. 154(b) by 761 days.

(21) Appl. No.: 12/520,379

(22) PCT Filed: Dec. 14, 2007

(86) PCT No.: PCT/EP2007/064006
§ 371 (c)(1),
(2), (4) Date: Jan. 22, 2010

(87) PCT Pub. No.: WO2008/080805
PCT Pub. Date: Jul. 10, 2008

(65) Prior Publication Data
US 2010/0133248 A1 Jun. 3, 2010

(30) Foreign Application Priority Data
Dec. 21, 2006 (FR) ...................................... 06 55790

(51) Int. Cl.
B23K 9/10 (2006.01)
B23K 9/12 (2006.01)

(52) U.S. Cl.
USPC ............ 219/130.01; 219/121.83; 219/121.85; 219/121.64

(58) Field of Classification Search ............. 219/130.01, 219/121.63, 121.64, 121.83, 121.85, 162
See application file for complete search history.

(56) References Cited

U.S. PATENT DOCUMENTS

| | | | | |
|---|---|---|---|---|
| 5,275,327 A | * | 1/1994 | Watkins et al. | 228/102 |
| 5,500,502 A | * | 3/1996 | Horita et al. | 219/121.63 |
| 2006/0249487 A1 | * | 11/2006 | Dunias et al. | 219/121.64 |

FOREIGN PATENT DOCUMENTS

| | | |
|---|---|---|
| JP | 10 006051 | 1/1998 |
| LU | 88 261 | 1/1994 |

* cited by examiner

Primary Examiner — Toan Le
(74) Attorney, Agent, or Firm — Oblon, Spivak, McClelland, Maier & Neustadt, L.L.P.

(57) ABSTRACT

A method for quality control of a weld bead made using a welding tool. The method collects, by an optical pyrometer having a high frequency acquisition sensor, at least one signal representative of the temperature of a melted portion of the weld bead, and includes a frequency phase for checking that the recurring frequencies are within an acceptable range of reference frequencies, to determine if the weld bead is defective.

15 Claims, 2 Drawing Sheets

METHOD AND DEVICE FOR QUALITY CONTROL OF A WELD BEAD

BACKGROUND

The invention relates to a method of checking the quality of a weld bead and to a device for implementing said method.

The invention relates more particularly to a method of checking the quality of a weld bead produced by means of a welding tool, of the type comprising at least the following successive steps:
- collection, by means of an optical pyrometer having a high-frequency acquisition sensor, of at least one signal representative of the temperature of a molten portion of the weld bead; and
- processing/analysis of said signal for the purpose of identifying possible defects in the weld bead.

When it is correctly carried out, welding, or the production of a weld bead, is a means widely used in the industry for producing a strong and reliable joint between two workpieces, especially two metal workpieces.

It is essential for the quality of the weld bead to be strictly and rigorously checked so as to ensure a high level of performance and reliability of the joint produced by means of a weld bead.

As is known, the weld bead is checked by visual inspection by an operator, or by optical inspection automatically by profilometric control.

Profilometry is a measurement method that consists in determining the profile of a surface.

Profilometric control is effective, but it is not sufficient for reliably evaluating the quality of a weld bead, as it provides information only about the external appearance of the weld bead.

By analyzing the temperature of the weld bead, more precisely by analyzing the signal representative of the temperature of the molten metal of a portion of the weld bead, it is possible to check the quality of the bead.

The signal representative of the temperature, hereafter called the temperature signal, is analyzed for the purpose of detecting a possible defect in the weld bead, or even of identifying the type of defect generated in question.

Various means are known for measuring the temperature of the molten metal of a weld bead.

A first known means comprises an infrared thermal camera, which delivers an image representative of the temperature of the observed zone, the image being analyzed and processed for the purpose of detecting a possible defect in the weld bead.

One drawback of an infrared thermal camera is its poor processing time/resolution ratio.

This is because either the image collected by the camera has a large number of pixels, in which case the resolution is good but the image processing time is long, or the collected image has a small number of pixels, in which case the processing time is short but the image resolution is too low.

A second known means for collecting the temperature of the molten metal of a weld bead is an optical pyrometer.

An optical pyrometer is a device capable of capturing the thermal radiation emitted by an element by means of a sensor and of delivering a signal representative of the temperature of said element.

Optical pyrometers are not all suitable for measuring the temperature of a weld bead, as some pyrometers deliver a signal having an acquisition frequency below the frequency of the physical phenomena that are encountered during the formation of the weld bead.

In addition, some optical pyrometers are not suitable for the emissivity of certain materials, which falsifies the precision of the measured temperature signal.

BRIEF SUMMARY

To alleviate these drawbacks, the invention provides a checking method of detecting a defect in a weld bead, reliably and in a short time, by extracting relevant information from a temperature signal, the temperature signal being collected by means of an optical pyrometer suitable for such a method.

To this end, the invention provides a checking method of the type described above, characterized in that the signal processing/analysis step includes a frequency phase which consists in recording the repetition frequencies of the signal by means of mathematical tools and in verifying that said repetition frequencies lie within a reference frequency-acceptance range, so as to determine whether the weld bead includes a defect.

In accordance with other features of the method according to the invention:
- the signal processing/analysis step includes an amplitude phase consisting in calculating the average amplitude of all or part of the signal and in verifying that said average amplitude lies within a reference average amplitude range, so as to determine whether the weld bead includes a defect;
- the signal processing/analysis step includes an average temperature phase consisting in calculating the average temperature from all or part of the signal and in verifying that said average temperature lies within a reference average temperature range, so as to determine whether the weld bead includes a defect;
- the signal processing/analysis step includes an extremum phase consisting in verifying that all or part of the signal lies within a reference extremum reference temperature range, the range being bounded by a maximum reference temperature and a minimum reference temperature, so as to determine whether the weld bead includes a defect; and
- the method includes a defect location step, consisting in locating a defect zone by calculation, by means of the temperature signal.

The invention also provides a device for implementing the method, of the type comprising:
- a welding tool; and
- an optical pyrometer which includes a high-frequency acquisition sensor capable of measuring the temperature of the weld bead undergoing melting, characterized in that the sensor is a photodiode of the InGaAs type, capable of measuring the temperature of the molten material at a frequency above 1000 hertz.

In accordance with other features of the device according to the invention:
- the sensor is capable of measuring the temperature of the molten material at a frequency above 3000 hertz;
- the sensor includes a wavelength adjustment range according to the emissivity of the material whose temperature is being measured, so as to measure the temperature of the molten material accurately; and
- the sensor is designed in such a way that it measures the temperature of the irradiated zone, or heated zone, of the weld bead.

BRIEF DESCRIPTION OF THE DRAWINGS

Other features and advantages of the invention will become apparent on reading the following detailed description, for the understanding of which the reader may refer to the appended drawings in which.

DETAILED DESCRIPTION

Hereafter, identical, analogous or similar elements will be denoted by the same references.

Figure 1:
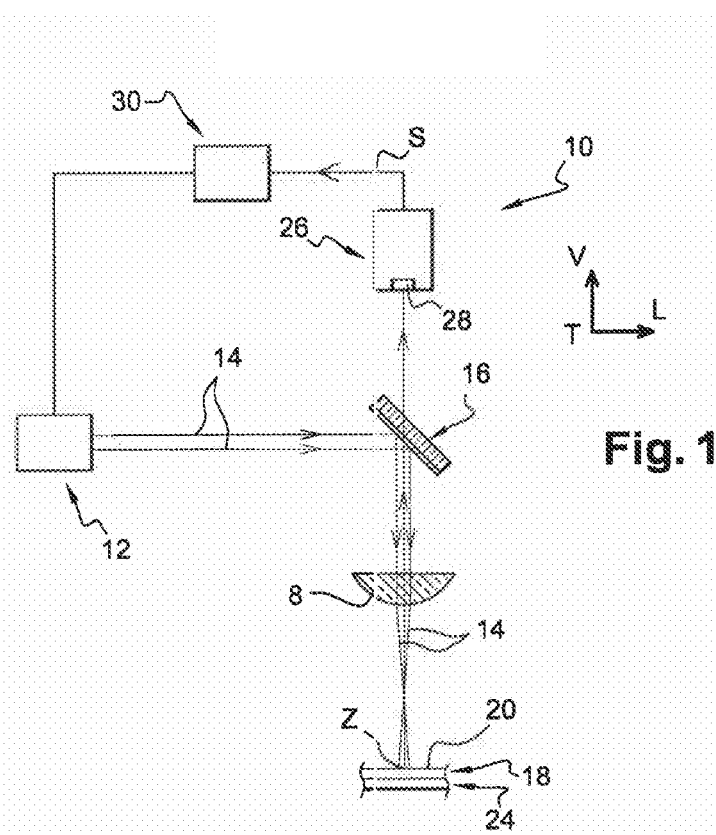
FIG. 1 is a schematic view that illustrates a device for implementing the method of checking the quality of a weld bead according to the invention.

In the rest of the description, the coordinate system L, V, T indicated in FIG. 1 will be used, nonlimitingly, to denote the longitudinal, vertical and transverse orientations.

FIG. 1 shows a device 10 for implementing a method of checking the quality of a weld bead according to the invention.

The device 10 comprises a welding tool 12 suitable for emitting a beam of laser radiation 14, horizontally and longitudinally.

The laser radiation 14 is sent onto a mirror 16, which is inclined so as to reflect said laser radiation 14 vertically onto a horizontal upper first sheet 18.

The horizontal upper first sheet 18 is placed on top of a horizontal lower second sheet 24, so that the two sheets 18, 24 can be welded together by through-welding.

The device 10 comprises a lens 8 placed on the path of the laser radiation 14, between the upper first sheet 18 and the mirror 16, so as to make the laser radiation 14 converge on the topside 20 of the first sheet 18.

Thus, during the welding operation, the laser radiation irradiates the topside 20 of the upper sheet 18 which undergoes melting, creating a weld pool.

That zone of the upper sheet 18 which is irradiated by the laser radiation 14 will be called hereafter the irradiation zone Z.

When the energy of the laser radiation 14 is high enough, a deep narrow capillary is formed in the weld pool. The capillary increases the penetration of the weld and transmits the energy of the laser radiation 14 to both sheets 18, 24.

To produce a weld bead for joining the two sheets 18, 24 together, the beam of laser radiation 14 is displaced in a regular manner, here in a horizontal longitudinal direction.

Thus, the capillary sustained by the laser radiation 14 is displaced longitudinally in the two sheets 18, 24, and the molten material surrounding it progressively solidifies as the capillary moves away from the irradiation zone Z, thereby creating the weld bead.

For this purpose, the device 10 is supported and moved relative to the two sheets 18, 24 by a robot (not shown).

The two sheets 18, 24 are each made of steel and covered with a zinc coating, such as a sheet for the body of a motor vehicle.

The two sheets 18, 24 are spaced apart, in a known manner, by a vertical gap (not shown) of the order of one tenth of a millimeter, which makes it possible, as is known, for the zinc vaporized when the two sheets 18, 24 are being welded together to be removed.

This is because, if there is no vertical gap between the two sheets 18, 24, the zinc that vaporizes before the steel has melted under the effect of the laser radiation 14 can result in gas overpressure between said two sheets.

This gas overpressure may expel material when the liquid pool forms, thus creating defects in the weld, such as holes.

The thermal radiation emitted by the irradiation zone Z is picked up by a sensor 28 of an optical pyrometer 26.

The optical pyrometer 26 is capable of delivering a temperature signal S representative of the temperature measured by the sensor 28.

The pyrometer 26 is placed entirely behind the mirror 16, on the vertical axis of the laser radiation 14 reflected by the mirror 16 onto the sheets 18, 24 to be welded.

Thus, the sensor 28 is placed away from the irradiation zone Z, thereby protecting it in particular from material spatter.

The mirror 16 is permeable to a range of various radiation wavelengths, especially to the wavelength of the thermal radiation emitted by the irradiation zone Z, so that the thermal radiation emitted by the irradiation zone Z can pass through the mirror 16.

Here, the sensor 28 of the pyrometer 26 is a photodiode 28 of the InGaAs (indium gallium arsenide) type, which meets the criteria required for implementing the method of checking the weld, described later in the description.

Specifically, the InGaAs photodiode here is capable of delivering measurements at a frequency above 1000 Hz, advantageously at 4000 Hz or above, i.e. at a frequency above the frequency at which the physical phenomena occur in the weld during the welding operation.

In addition, the pyrometer 26 can be regulated, that is to say the photodiode 28 here can be calibrated according to the emissivity of the material at the welding temperatures of the surface measured.

Thus, the pyrometer 26 is capable of delivering a temperature signal S, the values of which are precise and representative of the temperature of the surface measured.

Finally, the photodiode 28 delivers a "slight" measurement, which can be analyzed within a short time, advantageously within a time of less than one second.

The temperature signal S emitted by the pyrometer 26 is sent to a processing unit 30 capable of carrying out calculations and analyses on the temperature signal S.

In addition, the processing unit 30 is connected to the welding tool 12, so that the welding tool can transmit information to the processing unit 30, for example information about the power of the emitted laser radiation 14.

The invention also relates to a method of checking the quality of the weld bead.

The checking method includes a preliminary step E0 of determining a number of reference measurements, or reference ranges, which serve as markers, or acceptance limits, as will be seen in the rest of the description.

The reference measurements obtained during said preliminary step E0 are for example calculated, and/or are for example obtained by observation and analysis of at least one reference temperature signal Sr which is collected during formation of a reference weld bead.

The expression "reference weld bead" is understood to mean a defect-free weld bead.

The checking method includes a collection step Ec, for collecting the temperature signal S by means of the pyrometer 26, as described above.

Figure 2:
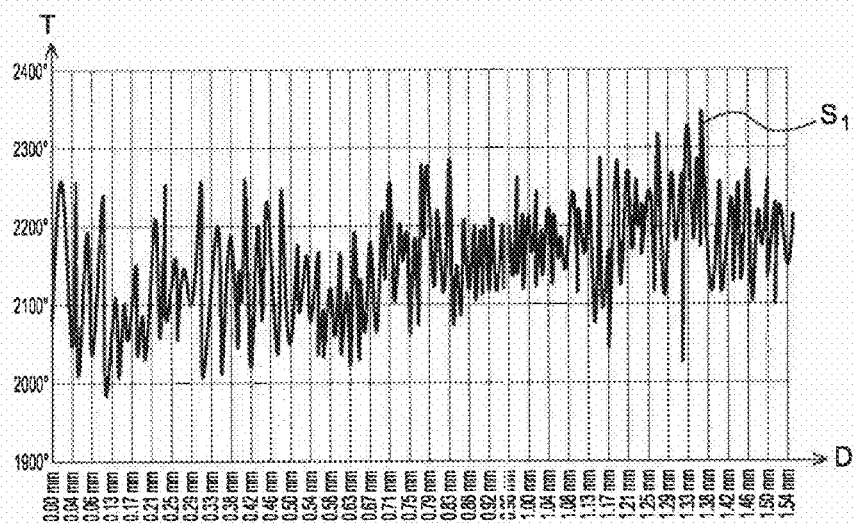
FIG. 2 is a graph, the curve of which illustrates a signal representative of the temperature of the molten metal of a weld bead, and is plotted as the temperature on the y-axis as a function of the displacement of the welding tool on the x-axis.
Figure 4:
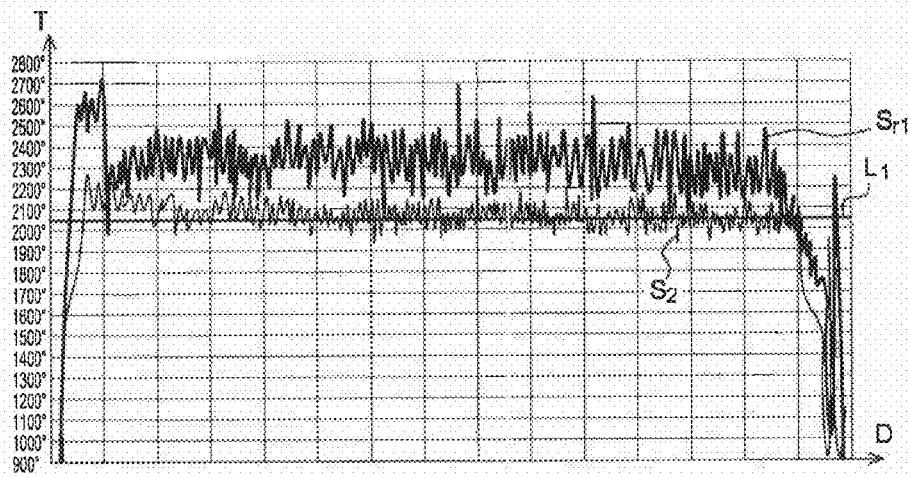
FIG. 4 is a graph, a first curve of which illustrates a reference signal and a second curve of which illustrates a temperature signal plotted as the temperature on the y-axis as a function of the displacement of the welding tool on the x-axis.
Figure 5:
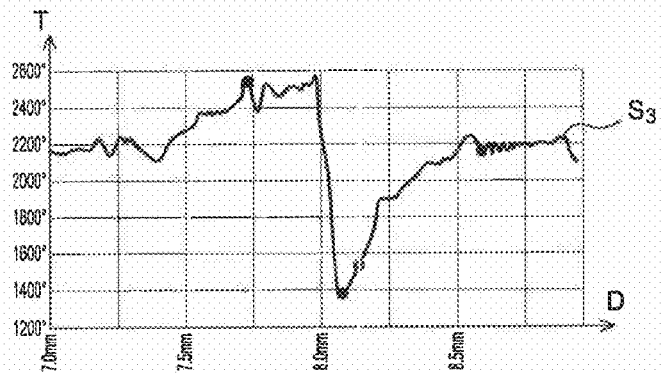
FIG. 5 is a graph, the curve of which illustrates a signal the repetition frequencies of the signal representative of the temperature of the molten metal of a weld bead, and is plotted as the temperature on the y-axis as a function of the displacement of the welding tool on the x-axis.

The letter "S" denotes here in general a signal corresponding to the temperature of the irradiation zone of the weld to be checked. FIGS. 2, 4 and 5 illustrate such signals to be checked, labeled $S_1$, $S_2$ and $S_3$ respectively.

FIG. 2 shows an example of a temperature signal $S_1$, which is plotted as the temperature T on the y-axis as a function of the distance D travelled by the welding tool 12 on the x-axis. The rate of displacement of the tool 12 is constant and known.

Next, the processing/analysis step Et for processing and analyzing the temperature signal collected during the collection step Ec is carried out for the purpose of identifying possible defects in the weld bead.

The temperature signal processing/analysis step Et starts for example at the end of the collection step Ec, or before the end of the collection step Ec, in parallel therewith, so as to optimize the time required for the method.

The temperature signal processing/analysis step Et includes a frequency phase Pf that consists in recording the repetition frequencies of the temperature signal by means of mathematical tools, here a Fourier transform.

Figure 3:
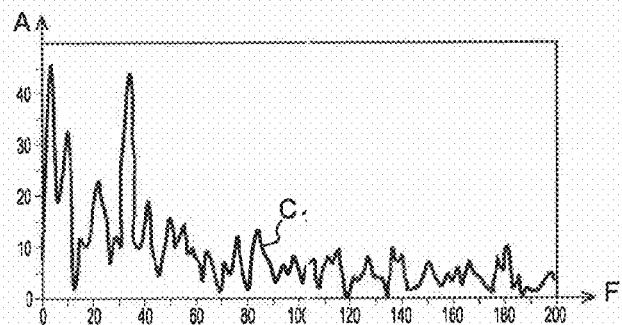
FIG. 3 is a graph, the curve of which illustrates the repetition frequencies of the temperature signal of FIG. 2, and is plotted as the amplitude on the y-axis as a function of the frequency on the x-axis.

Shown as an example in FIG. 3 is a graph, the curve $C_1$ of which illustrates the repetition frequencies of the temperature signal $S_1$ of FIG. 2, the graph of FIG. 3 comprising the recorded frequencies F plotted on the x-axis and the amplitude A of the frequencies F plotted on the y-axis.

The repetition frequencies are representative of the respiration of the weld capillary and correspond to the weld solidification ripples. The repetition frequencies are thus linked to weld formation.

The frequency phase Pf of the processing/analysis step Et consists in observing whether the repetition frequencies belong to a reference frequency acceptance range determined during the preliminary step E0 of determining the reference measurements.

If the repetition frequencies are outside the reference frequency acceptance range, then the weld is considered to be defective.

The signal processing/analysis step Et includes an amplitude phase Pa, consisting in calculating the average amplitude of the signal and in comparing said average amplitude with a reference average amplitude range, which is determined during the preliminary step E0 of determining the reference measurements.

FIG. 4 shows a graph comprising a first, reference signal $S_{r1}$ and a second, temperature signal $S_2$ which are plotted as the temperature T on the y-axis as a function of the distance D travelled by the welding tool 12 on the x-axis.

As may be seen in FIG. 4, the signal $S_2$, which is here the temperature signal from a weld to be checked, has a lower amplitude than the reference signal $S_{r1}$.

If the average amplitude of the recorded temperature signal $S_2$ is outside the reference average amplitude range, then the weld is considered to be defective.

The signal processing/analysis step Et includes an average temperature phase Ptm, which consists in calculating the average temperature from the signal and in verifying that said average temperature falls within a reference average temperature range determined during the preliminary step E0 of determining the reference measurements.

As may be seen in the example shown in FIG. 4, the average temperature corresponding to the signal $S_2$ is generally 2050° C., as shown by the line $L_1$, and the reference average temperature range is for example between 2200° C. and 2400° C.

If the average amplitude of the recorded temperature signal is outside the reference average temperature range, as in the example shown in FIG. 4, then the weld is considered to be defective.

The signal processing/analysis step Et includes an extremum phase Pe, which consists in verifying that all or part of the recorded signal lies within a reference extremum temperature range, the range being bounded by a maximum temperature and a minimum temperature.

FIG. 5 shows by way of example a graph comprising a portion of a temperature signal $S_3$, which is plotted as the temperature T on the y-axis as a function of the distance D travelled by the welding tool 12 on the x-axis.

As may be seen in FIG. 5, the signal $S_3$ reaches a maximum temperature close to 2600° C. and a minimum temperature of about 1400° C.

If the maximum temperature and/or the minimum temperature corresponding to the recorded temperature signal $S_3$ are/is outside the reference extremum temperature range, which is determined during the preliminary step E0 of determining the reference measurements, then the weld is considered to be defective.

The reference extremum temperature range is for example between 2400° C. and 2000° C.

A finer analysis consists in taking into account the time during which the temperature signal to be checked is outside the reference extremum temperature range, thereby making it possible for example to determine the nature of the weld defect.

In addition, the method includes a location step E1, which consists in locating the defect.

Specifically, when the acquisition frequency of the sensor 28 and the rate of displacement of the welding tool 12 are known, it is possible to determine the position of the defect in the weld bead, by identifying that portion of the temperature signal indicative of a defect.

Without being limiting, the checking method according to the invention may be supplemented with at least one additional control, such as a profilometric control.

The invention claimed is:

1. A method of checking a quality of a weld bead produced by a welding tool, the method comprising:
   collecting, by an optical pyrometer including a high-frequency acquisition sensor, at least one signal representative of a temperature of a molten portion of the weld bead, the high-frequency acquisition sensor performing measurements at a frequency above 1000 Hertz; and
   processing/analyzing the at least one signal for identifying possible defects in the weld bead,
   wherein the at least one signal processing/analyzing includes a frequency phase for recording repetition frequencies of the at least one signal by mathematical tools and verifying that the repetition frequencies lie within a reference frequency-acceptance range, so as to determine whether the weld bead includes a first defect.

2. The method as claimed in claim 1, wherein the at least one signal processing/analyzing further includes an amplitude phase for calculating an average amplitude of all or a part of the at least one signal and verifying that the average amplitude lies within a reference average amplitude range, so as to determine whether the weld bead includes a second defect.

3. The method as claimed in claim 1, wherein the at least one signal processing/analyzing further includes an average temperature phase for calculating average temperature from all or a part of the at least one signal and verifying that the average temperature lies within a reference average temperature range, so as to determine whether the weld bead includes a third defect.

4. The method as claimed in claim 1, wherein the at least one signal processing/analyzing further includes an extremum phase for verifying that all or a part of the at least one signal lies within a reference extremum temperature range, the reference extremum temperature range being bounded by a maximum reference temperature and a minimum reference temperature, so as to determine whether the weld bead includes a fourth defect.

5. The method as claimed in claim 1, further comprising: locating a defect zone within the weld bead by a calculation based on the at least one signal representative of the temperature of the molten pool of the weld bead.

6. A device for implementing the method as claimed in claim 1, comprising:
   a welding tool;
   an optical pyrometer including a high-frequency acquisition sensor that measures the temperature of the molten portion of the weld bead, and
   a processing unit configured to
      receive the at least one signal representative of the temperature of the molten portion of the weld bead,
      identify the repetition frequencies of the at least one signal by mathematical tools, and
      verify that the repetition frequencies lie within the reference frequency-acceptance range,
   wherein the sensor is a photodiode of an InGaAs type, which measures the temperature of the molten portion of the weld bead at a frequency above 1000 Hertz.

7. The device as claimed in claim 6, wherein the sensor measures the temperature of the molten portion of the weld bead at a frequency above 3000 Hertz.

8. The device as claimed in claim 6, wherein the sensor includes a wavelength adjustment range according to an emissivity of a material of the weld bead, so as to measure the temperature of the molten portion of the weld bead accurately.

9. The device as claimed in claim 6, wherein the sensor measures a temperature of an irradiated zone, or a heated zone, of the weld bead.

10. The device as claimed in claim 6, wherein the processing unit is further configured to receive information regarding a power emitted from the welding tool.

11. The method as claimed in claim 1, wherein the high frequency acquisition sensor performs measurements at a frequency above 3000 Hertz.

12. The method as claimed in claim 1, further comprising:
   collecting at least one reference signal during a formation of a reference weld bead, the at least one reference signal being representative of a temperature of a molten portion of the reference weld bead, and
   determining that the reference weld bead is free from defects.

13. The method as claimed in claim 12, further comprising defining at least one acceptance range based on the at least one reference signal.

14. The method as claimed in claim 1, further comprising:
   calibrating the optical pyrometer according to an emissivity of a material included in the weld bead.

15. A method of checking a quality of a weld bead produced by a welding tool, the method comprising:
   creating a weld bead on a workpiece by traversing the welding tool along a distance, the weld bead having a length corresponding to the distance of traversing the welding tool;
   collecting a plurality of temperature data points from an optical pyrometer during the traversing the welding tool, the plurality of temperature data points corresponding to a plurality of locations along the weld bead, each of the plurality of temperature data points indicative of a temperature of a molten portion of the weld bead;
   associating each of the plurality of temperature data points with a location along the length of the weld bead;
   identifying indicia of a defect in the weld bead from the plurality of temperature data points; and
   identifying a location of the defect along the length of the weld bead based on a location corresponding to the indicia of the weld bead defect.

* * * * *